United States Patent
Martin et al.

(10) Patent No.: US 7,936,925 B2
(45) Date of Patent: May 3, 2011

(54) PAPER INTERFACE TO AN ELECTRONIC RECORD SYSTEM

(75) Inventors: Nathaniel G. Martin, Rochester, NY (US); Naveen Sharma, Fairport, NY (US); Michael P. Kehoe, Rochester, NY (US); Robert St. Jacques, Jr., Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 642 days.

(21) Appl. No.: 12/048,450

(22) Filed: Mar. 14, 2008

(65) Prior Publication Data

US 2009/0232398 A1    Sep. 17, 2009

(51) Int. Cl.
*G06K 9/00*    (2006.01)
(52) U.S. Cl. .......................... 382/175; 382/176; 382/179
(58) Field of Classification Search .................. 382/175, 382/176, 179, 305, 317
See application file for complete search history.

(56) References Cited

U.S. PATENT DOCUMENTS

| | | | |
|---|---|---|---|
| 6,178,270 B1 | 1/2001 | Taylor et al. | |
| 6,873,435 B1 * | 3/2005 | Tehranchi et al. | 358/1.9 |
| 7,321,688 B2 | 1/2008 | Fujiwara | |
| 7,331,523 B2 | 2/2008 | Meier et al. | |
| 2007/0168382 A1 * | 7/2007 | Tillberg et al. | 707/102 |
| 2007/0183688 A1 | 8/2007 | Hollfelder | |

* cited by examiner

*Primary Examiner* — Phuoc Tran
(74) *Attorney, Agent, or Firm* — Gibb I.P. Law Firm, LLC

(57) ABSTRACT

After markings have been placed on a pre-printed form by a user who interacted with an entity, the form is scanned to produce a scan file. The scan file is analyzed to identify whether user added markings are present on machine readable selection items. The method can take a number of automated actions, depending upon which pre-printed machine readable selection items were checked by the user. For example, in response to checkbox selections, the method can obtain (read) some form of electronically storable data relating to the entity based on which of the machine readable selection items the user checked. Alternatively, in response to other checkbox selections, the method can ignore the user added markings on the machine readable selection items. In addition, in response to the checkmarks, the system can maintain only an image of the user added handwritten text. Alternatively, the system can be instructed to not only maintain an image of the user added handwritten text, but to automatically forward the image of the user added handwritten text to a transcription center.

20 Claims, 3 Drawing Sheets

202

Name: Joe Smith
DOB: 6/23/1955.
SSN: 123-45-6789.
Attending: Dr Roberts.
Carrier: Health Insurance R Us.
Insurance #: 143-F0DLR-DIG430-
03034-OBTDL.
Patient complains of itchy follicles and a shortness of digits. Working on increasing plasticity of haberdashery
Warning: Allergic to criticism

Today's Date:
4/21/2008

Tracking #:
1459320.

204

206
☐ Stroup Test.   ☐ Crash Test.   ☐ PDQ-OK.
☐ OCQ/EMR.      ☐ BCT.          ☐ OMR-DT.

Handwritten Notes:

208

Handwritten Drawings:

210

Transcribe?   ☐ Yes   ☐ No
Retain Image? ☐ Yes   ☐ No

Transcribe?   ☐ Yes   ☐ No
Retain Image? ☐ Yes   ☐ No 214            212                                212

Wrong Form?  ☐ Yes (only handwritten data will be recorded)

PAPER INTERFACE TO AN ELECTRONIC RECORD SYSTEM

BACKGROUND AND SUMMARY

Embodiments herein generally relate to Electronic Medical Records (EMR) systems and more specifically to a method and system that use checkboxes on pre-printed forms to control the flow of images and the transcription of handwritten notes.

During a patient visit, the health care provider first review the patient's medical record, examines the patient noting any important information that comes to light, then updates the patients medical record with the new information. Most physicians use paper medical records; however, such systems are being replaced by Electronic Medical Records (EMR) because EMR has significant advantages, and cost savings. One disadvantage of such electronic records systems is that they slow down health care providers and make them less efficient. Another disadvantage is that the process of entering the data into the EMR while that patient is present can interfere with the patient-health care provider interaction. Some healthcare information technology providers estimate that they can see only 80% of the patients they saw before the introduction of EMR and that some health care providers leave a practice when an EMR is installed.

Reasons for this reduction in efficiency are numerous. For example, some health care providers find that data entry can interfere with health care provider patient interactions. Interacting with a form and a computer monitor requires the health care provider to focus visual attention on the screen. However, notes can be jotted on a paper form without breaking eye contact. In addition, if the wrong form is presented by the EMR, the health care provider may need to spend time searching for the appropriate form. The wrong form is often presented when a patient has multiple complaints. With a paper form, the health care provider can jot notes on the form while interacting with the patient and transfer the information to the correct form after the patient leaves. In addition, old-fashioned paper forms are still useful because health care providers can preserve current work practices. With proper forms, the health care provider does not need to learn a new way of entering data In view of such issues, the embodiments described herein provide a method and system that allows health care providers to interact with the paper systems (where they may be most effective) while preserving the EMR system for the benefits it provides. These benefits rely on the data being interpretable by the machine, which limits the effectiveness of images because, without metadata (i.e. machine interpretable data describing the semantics of the images) the semantics of such information cannot be processed by the machine. More specifically, a method embodiment herein prints a selected form designed to collect data using standard work flows that minimize impact on the health care provider-patient interaction. The form has printed thereon machine readable data identifying the entity (e.g., barcodes, glyphs, etc.); machine readable selection items relating to data to be captured by the form (checkboxes, etc.); and spaces for handwritten text, which can be lined or just blank space.

During the examination, the health care provider marks the form with notes. After the examination, the form is scanned to form an image which is stored and associated with the patient's record. The image is further processed to update the EMR and, potentially, handwritten elements may be sent to transcribers for information extraction. Different elements on the form are segregated depending on the processing they require.

The marks on the form are interpreted in one of three ways: they may be interpreted as data that is to be inserted directly into the EMR, they may be interpreted as images that are to be stored, possibly for further processing, or they may be interpreted as instructions for further processing of the other marks on the form.

For example, handwritten notes are currently difficult for machines to interpret so the handwritten notes the health care provider makes may be stored as images of the handwriting, which may be forwarded to transcribers to be entered as data. Other types of marks that machines are able to interpret, such as check boxes or numerals, may be transformed by the machine into machine interpretable data and entered into the data portion of the EMR. As an example of such interpretation, the health care provider may select a check box that indicates a primary diagnosis to be entered into the EMR. The marks the machine is able to interpret may also be transformed into machine interpretable data and stored as metadata with associated images.

The machine interpretable marks may also indicate special processing for other marks on the form. For example, in response to checkbox selections (or other user added markings) on the machine readable selection items, the method can ignore certain information on the form, so, if the user found that the incorrect form had been printed, the user could make handwritten notations on the form to tell the system (by checking the appropriate box) that none of the pre-printed machine readable selection items should be considered, regardless of whether any of the other boxes had been inadvertently checked, and that only the handwriting should be utilized.

In addition, when analyzing the scan file, the method can determine whether the user added handwritten text in the spaces available for handwritten text. If user added handwritten text is present, the method operates in response to the checkmarks (the user added markings) on the machine readable selection items regarding how to process such handwriting. Such checkmarks can cause the system to maintain only an image of the user added handwritten text, which is less expensive. Alternatively, the checkmarks can instruct the system to not only maintain an image of the user added handwritten text, but to automatically forward the image of the user added handwritten text to a transcription center, so that the handwritten text can be transcribed into the electronically storable data relating to the entity, which is more expensive. The transcription of the handwritten text can include performing manual transcription and/or performing automated handwriting recognition.

Therefore, the use of the checkboxes allows the user to be cost efficient in transcribing only the material that justifies the added transcription expense. However, as the embodiments herein only supply this instruction to transcribe through the form's checkboxes, and do not require any computerized or manual instruction to perform expensive transcription, the system is highly efficient and produces cost savings.

The electronically storable data relating to the entity that is obtained from the checked machine readable selection items and from the transcribed handwritten notes can be output to a database that maintains information regarding the entity. The transmission of the images of the user added handwritten text and the electronically storable data can be performed by transmissions over a computerized network. If a completely paperless system is utilized, the method can destroy the form after the form is scanned.

In addition, the embodiments herein include system embodiments. System embodiments will use a printer connected to a processor, an electronic memory (also connected to the processor) that maintains a form repository and a database, and an electronic record system (also connected to the processor). The electronic record system has the capability to manage the database and direct the printer to print forms from the form repository. Again, such forms relate to a specific entity, and the forms include machine readable data identifying the entity, machine readable selection items relating to data to be captured by the form, and spaces for handwritten text. In particular, the printed form will contain machine readable data that indicates which electronic medical record the data captured from the form should be associated with. It may also include data such as the date of the visit and the health care provider performing the examination.

The system embodiments will also include a scanner (connected to the processor). After the markings have been placed on the form by the health care provider who interacted with the patient, the scanner scans the form to produce a scan file. A shredder can be used to destroy the form after the form is scanned.

The electronic record storage system analyzes the scan file to identify whether user added markings are present on the machine readable selection items. The electronic record storage system obtains the electronically storable data relating to the entity based on the marks on the checkboxes (user added markings) on the machine readable selection items.

The electronic record storage system also determines whether user added handwritten text is present in the spaces for handwritten text. If the user added handwritten text is present, the electronic record storage system takes different actions in response to which checkboxes are marked. If certain boxes are checked, the electronic record storage system will maintain only an image of the user added handwritten text (to save costs). Alternatively, if other checkboxes are checked, the electronic record storage system will maintain an image of the user added handwritten text, and also automatically forwarding the image of the user added handwritten text to a transcription center. The actions indicated by the checkboxes (or other machine interpretable marks) are driven by the processing specified by machine interpretable marks printed on the form.

The transcription center transcribes the handwritten text into additional machine interpretable data relating to the entity. The transcription center comprises a manual transcription station and/or an automated handwriting recognition station. The electronically storable data is then output to the database over a network. The image of the user added handwritten text is also transmitted over the network to the transcription center.

As described in U.S. Patent Publication 2007/0183688 (the complete disclosure of which is incorporated herein by reference) the acquisition, storage and correlation of certain types of data may prove difficult in certain circumstances. The example used in that patent publication relates to capturing insurance adjusters written notes and photographs, however, the techniques taught by this publication are also applicable when processing medical notes.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 2 is a schematic diagram illustrating a form according to embodiments herein.

DETAILED DESCRIPTION

As mentioned above, despite the efficiencies gained through electronic record-keeping systems, some interactions are still performed more efficiently with old-fashioned pen and paper. In view of this, the embodiments herein combine the best of the electronic record-keeping system and best of the highly efficient pen and paper system. The embodiments herein use any form of a printing and scanning device (such as a multifunction device (MFD) that can print, scan, copy, fax, etc.) coupled to an electronic record keeping system. The embodiments herein print a form with space for structured and unstructured information, as well as the standard preprinted information associated with the electronic record-keeping system. Some of the examples used herein describe an electronic record-keeping system for medical records used by doctors and other health care providers. However, one ordinarily skilled in the art would understand that the medical field is only an example used to illustrate features of the invention, and that the invention is equally applicable to all fields that utilize electronic record-keeping, such as the insurance industry described in U.S. Patent Publication 2007/0183688 (mentioned above), the banking industry, the restaurant industry, the travel industry, etc.

With embodiments herein, a healthcare provider enters data on the form, and then it is scanned back into the system. The system extracts the structured information and enters it into the EMR. The embodiments herein then take the unstructured information and store images of the information in the EMR. If specific boxes are checked by the healthcare provider, the unstructured information can be automatically transcribed.

If doctors are using an EMR, they enter data using a keyboard, stylus, pointing device, etc. while sitting at a computer, computer terminal, or using some form of wireless mobile computing device. When entering data into such automated systems, the doctors must select items from drop down lists to choose commonly occurring notes or type information while they are in the exam room. They then dictate notes or type more extensive notes later after they have finished meeting with the patient. If they are using paper medical records, they write brief notes into the record then dictate or write more extensive notes later. Work practice has discovered the EMR systems disrupt the interaction with the patient because the health care provider has to break eye contact with the patient to interact with the EMR system. To the contrary, with the embodiments described herein, the doctor can make notes onto a paper form that is prepared for an individual patient and scanned back into the machine for later processing, freeing the health care provider from having to enter data into a computer.

Figure 1:
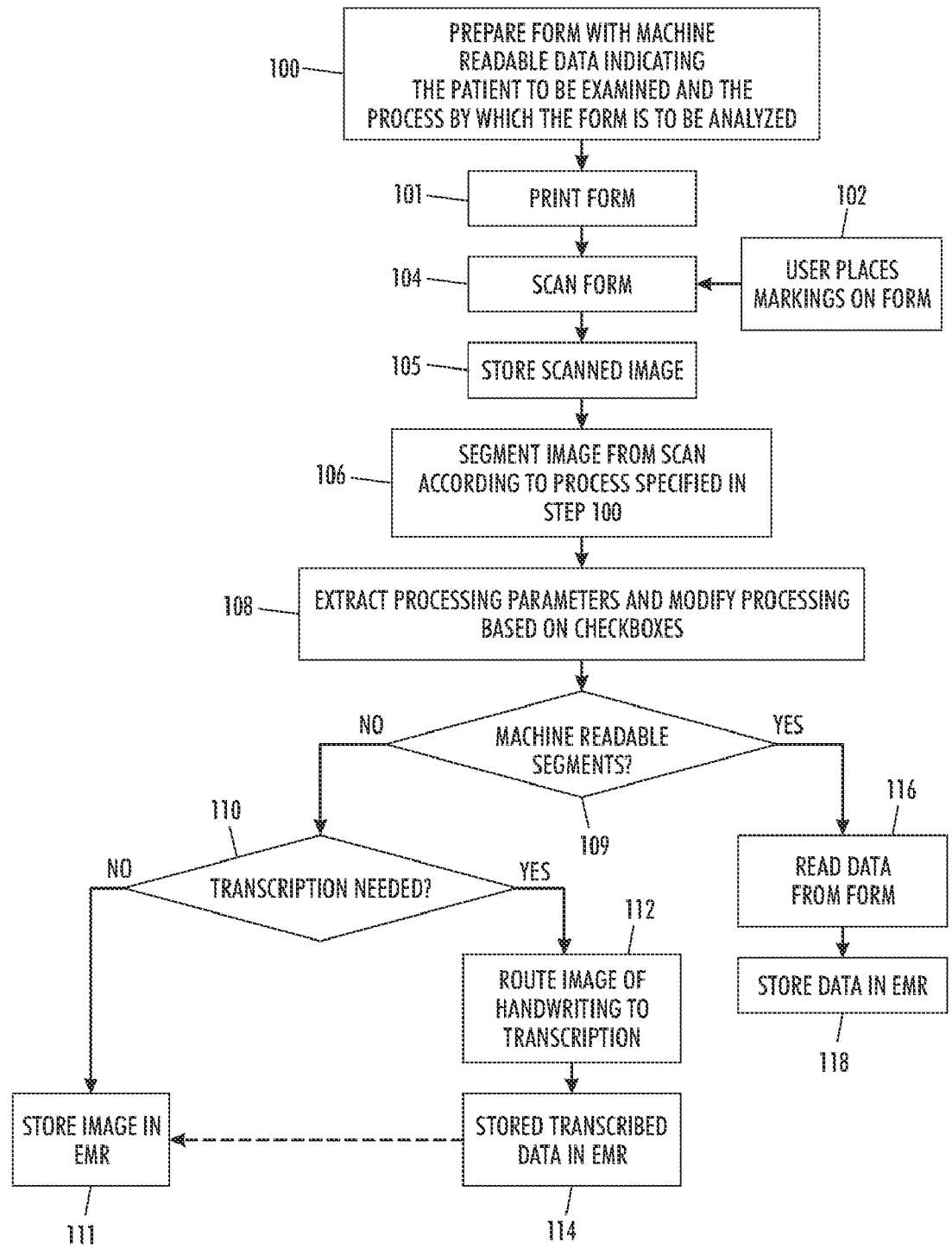
FIG. 1 is a flow diagram illustrating embodiments herein.

As shown in flowchart form in FIG. 1, a method embodiment herein prepares a selected form relating to an entity (e.g., a person, a company, an incident, etc.) in item 100. The prepared form will contain machine readable data that indicates the entity or entities that the form relates to an indication as to how the data on the form is to be processed. The form is then printed in item 101. The form need not necessarily be printed to paper. For example, it would also be possible to put the form on a tablet PC and allow the physician to mark it using a stylus.

The form, an example 200 of which is shown in FIG. 2, has printed thereon machine readable data 202 identifying the entity (e.g., barcodes, glyphs, etc.); machine readable items 206 relating to data to be captured by the form (checkboxes, numerals, etc.); and spaces 208, 210 for handwritten text, which can be lined or just blank space.

The form is retrieved from a form repository (possibly residing on another machine connected through a service on a local MFD). The form is customized for each entity and contains specifics regarding the current situation of the entity. Therefore, the form would contain different check box information if the entity was a new patient and was present for an initial consultation, when compared to an existing patient. Similarly, the form contains different information if the patient had made an appointment for back pain compared to if the patient had made an appointment for foot pain. Therefore, the form is highly customized to the specific patient and their current needs.

Many sources can be used to obtain the information required to create such highly individualized and specialized forms 200. For example, data can be collected from a local EMR connected through a database connectivity server running on a local MFD. This data can be the data required to fill out the form. The data in the local EMR may also include information on connectivity to other external databases through the Regional Health Information Organization (RHIO). The RHIO is a federation of medical database including (a) other EMR (b) pharmacy records and (c) payer databases. Additional data may be collected through the RHIO (or through direct connections to other known database) through an external database connection. The external database connection will manage authentication and schema translation. The data collected from the local EMR and through the RHIO is combined with the form producing an encounter form that contains fields for structured data and fields for unstructured data. The form is printed out and left near the examining room where the doctor can retrieve it. Machine readable meta-data is added 202 to the form. Such metadata includes: chart number, date, patient name, patient date of birth, etc.

As shown in FIG. 2, the form 200 indicates which information is required for this interaction and information about how data collected from the scanned image is to be processed. The form includes blank spaces 208, 210 on which the doctor can write anything he or she wishes. These spaces 208, 210 will be stored as an image for later human processing.

After markings have been placed on the form by a user (e.g., doctor) who interacted with the entity (patient) 102, the form is scanned 104 to produce a scan file. The resulting image is stored in an image repository with associated metadata read from the machine readable file. The scan file is segmented into its component pieces 106 including the elements that can be automatically transformed into EMR data (e.g., check boxes, numerals, etc), elements that cannot be translated automatically (e.g. handwriting, drawings, graphics) and data elements that indicate how the form is to be translated (e.g. check boxes, etc). Those segments then determine how the images to be processed are translated and submitted as parameters to the interpretation algorithm 108. If a form segment contains only data that is easily machine readable, (as determined by decision box 109) the data is simply machine read 116 and the data stored in the EMR 118. However, there may be some segments of the form that are not machine readable and processing moves to item 110. The machine readable meta-data 202 is decoded giving the MFD instructions on how to process the rest of the form and the parameters retrieved from step 108 are passed to the algorithm. The meta-data 202 may also include information such as the chart number, user, and today's date. The structured information and the unstructured information is separated. The MFD may request information from the EMR such as a patients preferred pharmacy. The structured information is entered directly into the EMR. This information is stored using the metadata retrieved from the machine readable portion of the form.

The method can take a number of automated actions, depending upon which pre-printed machine readable selection items were checked by the user. For example, in response to checkbox selections of machine readable selection items 206, the method can obtain (read) some form of electronically storable data relating to the entity based on which of the machine readable selection items the user checked. For example, a check in the first box of item 206 could indicate that Joe Smith needs a stroup test, and a prescription or test referral form could be immediately and automatically generated.

Information that is to be sent to a third party can be delivered directly through the network simply upon the scan file indicating that a specific check box was checked, and without requiring further action from any individual. For example, lab requests and necessary information can be sent directly to the lab, without the doctor or staff being involved. Similarly, if needed, prescriptions can be sent directly to the pharmacy indicated by the EMR system. If the drug is a schedule 3 drug, a prescription form may need to be used.

Alternatively, in response to certain checkbox selections on other the machine readable selection items 214, the method can ignore all other added markings on the other machine readable selection items. Thus, for example, if the user found that the incorrect form had been printed (possibly even after the form is partially completed) the user could simply make handwritten notations on the form and tell the system (by checking the appropriate box 214) that none of the pre-printed machine readable selection items should be considered, and that only the handwritten notations should be read as electronically storable data. All of the marks entered by the user are extracted from the form prepared in step 100.

In addition, when analyzing the scan file, the method can determine whether the user added marks that cannot be translated into machine interpretable data in the spaces available for handwritten text 109. If the user added marks that are not easily translated into machine interpretable data, the method determines if a transcription of such marks is needed in item 110 in response to the checkmarks (the user added markings) on the machine readable selection items 214 to process the form. Such checkmarks can cause the system to maintain only an image of the user added handwritten text item 111, which is less expensive.

Thus, if information that is not easily machine translated is present, the system determines whether the information should be transcribed 110. This determination 110 may be made by standing policy or as a parameter entered as a check box 212. Alternatively, the system may not only maintain an image 111 of the user added handwritten text, but may also automatically forward the image of the user added handwritten text to a transcription center 112 so that the handwritten text can be transcribed into the electronically storable data relating to the entity (which is more expensive). The transcription center may then enter the data into the EMR 114. Such data may be a simple transcription of handwritten notes, or information may be extracted from the handwritten notes and entered as machine interpretable data into the EMR. The data may be entered into the EMR by the transcription service, or it may be extracted automatically from the machine interpretable data. For example, if the health care provider added a handwritten note that the patient's weight was 150, the phrase "weight 150" can be extracted from the text and inserted in the database as the patient's weight on the date of the exam.

The transcription of the handwritten text can include performing manual transcription and/or performing automated handwriting recognition. The free form text can therefore be processed by a human being. The human could be either the doctor or a third party. Sending the information to a third party allows the routine tasks of updating the database to be offloaded from the doctor and the medical staff.

Thus, the form, which was prepared in step 100, can include many types of fields. For example, information can be retrieved from the database and printed on the form; computed form information such as serial number and today's date can be included on the form; and notes containing information tailored to the particular doctor and setting. For example, a specialist may want information relevant to the specialty; a general practitioner may want the last note. Further, warnings can be printed in attention catching form. As shown above, structured information such as that captured by check boxes, circles, ovals, blanks, etc. For example, current encounter forms include check boxes for the common diagnoses seen by the office. These check boxes can also be used to create the bill. Additional pieces of paper encoded with information that will associate them with this form can also be provided.

With respect to the machine readable area, this area contains information that helps the machine process the information added to the form. It includes tracking number for the form and may include the patient ID, the doctor ID, today's date. It also includes information on how to interpret the structured information (e.g., which boxes go with which tests) and how to process the free form text (e.g. where the free form text should go: possibilities include transcription service or doctors to do list.)

Therefore, the use of the checkboxes 206, 212, 214 (or other marks than may be interpreted by the machine) allows the user to be cost efficient in transcribing only the material that justifies the added transcription expense. However, as the embodiments herein only supply this instruction to transcribe through the form's checkboxes, and do not require any computerized or manual instruction to perform expensive transcription, the system is highly efficient and produces cost savings.

The electronically storable data relating to the entity that is obtained from the checked machine readable selection items 116 and from the transcribed handwritten notes can be output to a database that maintains information regarding the entity 118. The transmission of the images of the user added handwritten text and the electronically storable data can be performed by transmissions over a computerized network. If a completely paperless system is utilized, the method can destroy the form after the form is scanned.

Figure 3:
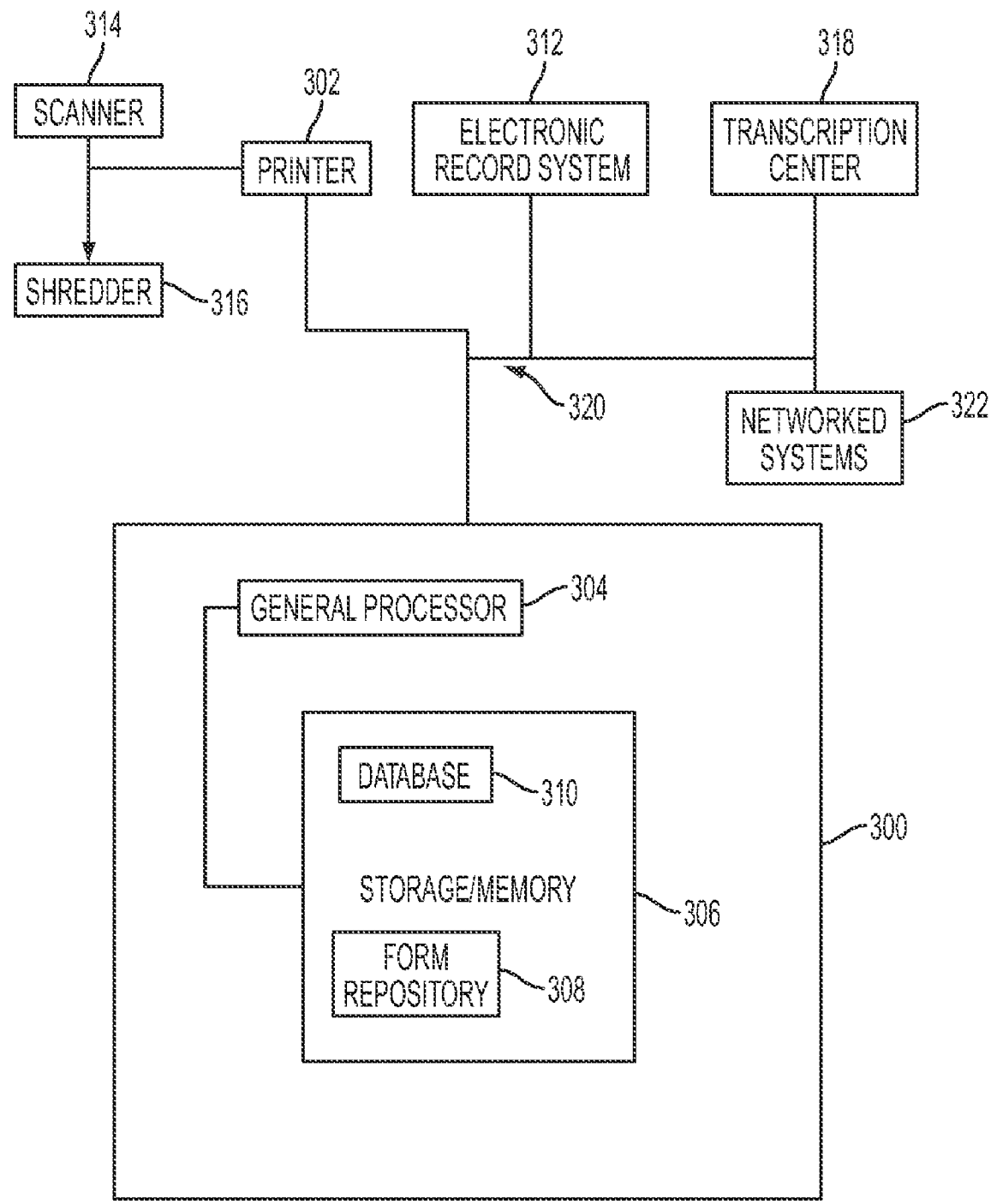
FIG. 3 is a schematic diagram illustrating a system embodiment.

In addition, the embodiments herein include system embodiments, as shown for example in FIG. 3. System embodiments will use a printer 302 connected to a computerized device 300 that can include a processor 304 an electronic memory 306 (also connected to the processor 304) that maintains a form repository 308 and a database 310, and an electronic record system 312 (also connected to the processor 304). The electronic record system 312 has the capability to manage the database 310 and direct the printer to print forms from the form repository. The system embodiments also include a scanner 314 (connected to the processor 304). After the markings have been placed on the form by the user who interacted with the entity, the scanner scans the form to produce a scan file. A shredder 316 can be used to destroy the form after the form is scanned.

The electronic record storage system 312 analyzes the scan file to identify whether user added markings are present on the machine readable selection items. The electronic record storage system 312 obtains the electronically storable data relating to the entity based on the marks on the checkboxes.

The electronic record storage system 312 also determines whether user added handwritten text is present in the spaces for handwritten text. If the user added handwritten text is present, the electronic record storage system 312 takes different actions in response to which checkboxes are marked. If certain boxes are checked, the electronic record storage system 312 will maintain only an image of the user added handwritten text (to save costs) in the memory 306. Alternatively, if other checkboxes are checked, the electronic record storage system 312 will maintain an image of the user added handwritten text, and also automatically forward the image of the user added handwritten text to a transcription center 318.

The transcription center 318 transcribes the handwritten text into additional electronically storable data relating to the entity. The transcription center comprises a manual transcription station and/or an automated handwriting recognition station. The electronically storable data is then output to the database 310 over a network 320. The image of the user added handwritten text is also transmitted over the network 320 to the transcription center 318. The database 310 and electronic record system 312 can supply information to and/or be maintained by other networked computers, servers and systems 322 such as a RHIO.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

Similarly, scanners and other similar peripheral equipment are available from Xerox Corporation, Norwalk, Conn., USA and Visioneer, Inc. Pleasanton, Calif., USA and the details of such devices are not discussed herein for purposes of brevity and reader focus. Systems for clarifying images and extracting data from images and scanned documents, are well known to those ordinarily skilled in the art and the details of such systems are not discussed herein. Such systems can utilize commercially available handwriting recognition and optical character recognition (OCR) systems. For example, see U.S. Pat. Nos. 6,178,270; 7,331,523; and 7,321,688; the complete disclosures of which are incorporated herein by reference.

All foregoing embodiments are specifically applicable to electrostatographic and/or xerographic machines and/or processes as well as to software programs stored on the electronic memory (computer usable data carrier 306) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   preparing a form relating to an entity, wherein said form comprises machine readable metadata identifying said entity and form processing instructions; machine readable selection items relating to data to be captured by said form; and spaces for handwritten text;
   providing said form on a medium that is capable of being marked;
   after markings have been placed on said form by a user who interacted with said entity, scanning said form to produce an image file;
   analyzing said image file to identify whether user added markings are present on said machine readable selection items;
   obtaining electronically storable data relating to said entity based on said user added markings on said machine readable selection items;
   determining whether user added handwritten markings are present in said spaces for handwritten text;
   if said user added handwritten markings are present and in response to said user added markings on said machine readable selection items, one of:
   maintaining only an image of said user added handwritten markings; and
   maintaining an image of said user added handwritten text markings, automatically forwarding said image of said user added handwritten text markings to a transcription center, and transcribing said user added handwritten markings into said electronically storable data relating to said entity; and
   outputting said electronically storable data relating to said entity.

2. The method according to claim 1, wherein said outputting of said electronically storable data comprises outputting said electronically storable data to a database that maintains information regarding said entity.

3. The method according to claim 1, wherein said transcribing of said user added handwritten markings comprises at least one of performing manual transcription and performing automated handwriting recognition.

4. The method according to claim 1, wherein said forwarding of said image of said user added handwritten markings comprises transmitting said image of said user added handwritten markings over a network to said transcription center.

5. The method according to claim 1, further comprising destroying said form after said form is scanned.

6. A method comprising:
   printing a form relating to an entity, wherein said form comprises machine readable data identifying said entity, machine readable selection items relating to data to be captured by said form, and spaces for handwritten text;
   after markings have been placed on said form by a user who interacted with said entity, scanning said form to produce a scan file;
   analyzing said scan file to identify whether user added markings are present on said machine readable selection items;
   in response to said user added markings on said machine readable selection items, one of:
   obtaining electronically storable data relating to said entity based on said user added markings on said machine readable selection items; and
   ignoring said user added markings on said machine readable selection items;
   determining whether user added handwritten text is present in said spaces for handwritten text;
   if said user added handwritten text is present and in response to said user added markings on said machine readable selection items, one of:
   maintaining only an image of said user added handwritten text; and
   maintaining an image of said user added handwritten text, automatically forwarding said image of said user added handwritten text to a transcription center, and transcribing said handwritten text into said electronically storable data relating to said entity; and
   outputting said electronically storable data relating to said entity.

7. The method according to claim 6, wherein said outputting of said electronically storable data comprises outputting said electronically storable data to a database that maintains information regarding said entity.

8. The method according to claim 6, wherein said transcribing of said handwritten text comprises at least one of performing manual transcription and performing automated handwriting recognition.

9. The method according to claim 6, wherein said forwarding of said image of said user added handwritten text comprises transmitting said image of said user added handwritten text over a network to said transcription center.

10. The method according to claim 6, further comprising destroying said form after said form is scanned.

11. A system comprising:
    a processor;
    a printer operatively connected to said processor;
    an electronic memory operatively connected to said processor, said electronic memory maintaining a form repository and a database;
    an electronic record system operatively connected to said processor, said electronic record system having a capability to manage said database and direct said printer to print a form from said form repository, where said form relates to an entity, and wherein said form comprises machine readable data identifying said entity, machine readable selection items relating to data to be captured by said form, and spaces for handwritten text; and
    a scanner operatively connected to said processor, wherein after markings have been placed on said form by a user who interacted with said entity, said scanner scans said form to produce a scan file;
    wherein said electronic record storage system:
    analyzes said scan file to identify whether user added markings are present on said machine readable selection items;
    obtains electronically storable data relating to said entity based on said user added markings on said machine readable selection items;
    determines whether user added handwritten text is present in said spaces for handwritten text;
    if said user added handwritten text is present and in response to said user added markings on said machine readable selection items, one of:
    maintain only an image of said user added handwritten text; and
    maintain an image of said user added handwritten text, automatically forwarding said image of said user added handwritten text to a transcription center that transcribes said handwritten text into said electronically storable data relating to said entity; and
    outputs said electronically storable data relating to said entity.

12. The system according to claim 11, wherein said electronic record storage system outputs said electronically storable data to said database.

13. The system according to claim 11, wherein said transcription center comprises at least one of a manual transcription station and an automated handwriting recognition station.

14. The system according to claim 11, further comprising a network operatively connected to said electronic records storage system, wherein said image of said user added handwritten text is transmitted over said network to said transcription center.

15. The system according to claim 11, further comprising a shredder that destroys said form after said form is scanned.

16. A computer storage device comprising:
- a non-transitory computer-readable medium storing instructions that, when executed by a computer, cause the computer to perform a method comprising:
- printing a form relating to an entity, wherein said form comprises machine readable data identifying said entity, machine readable selection items relating to data to be captured by said form, and spaces for handwritten text;
- after markings have been placed on said form by a user who interacted with said entity, scanning said form to produce a scan file;
- analyzing said scan file to identify whether user added markings are present on said machine readable selection items;
- obtaining electronically storable data relating to said entity based on said user added markings on said machine readable selection items;
- determining whether user added handwritten text is present in said spaces for handwritten text;
- if said user added handwritten text is present and in response to said user added markings on said machine readable selection items, one of:
  - maintaining only an image of said user added handwritten text; and
  - maintaining an image of said user added handwritten text, automatically forwarding said image of said user added handwritten text to a transcription center, and transcribing said handwritten text into said electronically storable data relating to said entity; and
- outputting said electronically storable data relating to said entity.

17. The computer storage device according to claim 16, wherein said outputting of said electronically storable data comprises outputting said electronically storable data to a database that maintains information regarding said entity.

18. The computer storage device according to claim 16, wherein said transcribing of said handwritten text comprises at least one of performing manual transcription and performing automated handwriting recognition.

19. The computer storage device according to claim 16, wherein said forwarding of said image of said user added handwritten text comprises transmitting said image of said user added handwritten text over a network to said transcription center.

20. The computer storage device according to claim 16, further comprising destroying said form after said form is scanned.

* * * * *